United States Patent [19]

Cassin et al.

[11] Patent Number: 4,725,405
[45] Date of Patent: Feb. 16, 1988

[54] ORGANOSILOXANE-SILICATE COPOLYMER ANTIFREEZE COMPOSITION WITH NITRATE CORROSION INHIBITOR

[75] Inventors: Thomas R. Cassin, Newtown, Conn.; Victor B. Jex, Scarsdale; William N. Matulewicz, Montgomery, both of N.Y.; Dale A. McKenzie, Ridgefield, Conn.; Paul H. Mohr, Chappaqua, N.Y.

[73] Assignee: First Brands Corporation, Danbury, Conn.

[21] Appl. No.: 32,058

[22] Filed: Mar. 27, 1987

Related U.S. Application Data

[63] Continuation of Ser. No. 802,575, Nov. 27, 1985, Pat. No. 4,664,833, which is a continuation-in-part of Ser. No. 363,829, Mar. 31, 1982, abandoned.

[51] Int. Cl.$^4$ .............................................. C23F 11/06
[52] U.S. Cl. ........................................ 422/7; 252/75; 252/78.3
[58] Field of Search ................... 252/75, 78.3; 422/7, 422/13

[56] References Cited

U.S. PATENT DOCUMENTS

| | | | |
|---|---|---|---|
| 2,172,075 | 9/1939 | Whaley | 252/75 |
| 3,337,496 | 8/1967 | Pines et al. | 260/46.5 |
| 4,241,014 | 12/1980 | Hirozawa et al. | 252/75 |
| 4,287,077 | 9/1981 | Wing | 252/75 |
| 4,455,248 | 6/1984 | Wood | 252/75 |

OTHER PUBLICATIONS

Uhlig, *Corrosion and Corrosion Control*, 2nd ed., pp. 14 & 39.
Hyde et al., "The Reaction Between Aluminum Metal and Aqueous Solutions of the Nitrite Ion," Corros. Australas., 6(2), 1981.
Wiggle et al., "The Effectiveness of Engine Coolant Inhibitors for Aluminum", Corrosion/80, paper No. 69.

*Primary Examiner*—Robert Wax
*Attorney, Agent, or Firm*—Gary L. Warner

[57] ABSTRACT

A corrosion-inhibited heat transfer composition concentrate comprising an alcohol, an organosiloxane/silicate copolymer, and a corrosion inhibiting amount of a nitrate salt. Such coolant concentrate may suitably be diluted with from about 25% to about 90% by weight of water based upon the weight of the concentrate, to form an aqueous composition which has particular utility as a corrosion-inhibited heat transfer composition for heat exchange systems, for example, those employed with internal combustion engines. Such compositions are highly effective in reducing corrosion in heat exchange systems containing components of aluminum construction.

9 Claims, No Drawings

ORGANOSILOXANE-SILICATE COPOLYMER ANTIFREEZE COMPOSITION WITH NITRATE CORROSION INHIBITOR

This application is a continuation of prior U.S. application Ser. No. 802,575, filing date 11/27/85, now U.S. Pat. No. 4,664,833, which is a continuation-in-part of application Ser. No. 363,829, filing date 3/31/82, now abandoned.

FIELD OF THE INVENTION

This invention relates to a corrosion-inhibitive heat transfer composition comprising alcohol, a water-soluble organosiloxane/silicate compolymer and a corrosion-inhibiting amount of a nitrate salt.

DESCRIPTION OF THE PRIOR ART

Corrosion-inhibitive heat transfer compositions of aqueous alcohol solutions heretofore have widely been employed in heat exchange systems associated with internal combustion engines, solar systems, and the like, to depress the freezing point of the coolant water, to raise its boiling point, and provide corrosion protection.

There are unique corrosion problems associated with the recent trend to the greater usage of aluminum in internal combustion engine cooling systems. In such systems, the use of prior art antifreeze/coolant compositions, which have been formulated for use in cooling systems constructed largely of steel, and which have employed corrosion inhibitors for ferrous metal surfaces, fail in many cases to provide adequate corrosion protection for the aluminum structural parts of the cooling system.

The prior art has proposed numerous corrosion-inhibitive heat transfer compositions based on alcohols and employing corrosion inhibitors. Various organic and inorganic inhibitors have been employed. Among the organic materials which have been utilized are the following: guanidine, citrates, coal tar derivatives, petroleum bases, thiocyanates, peptones, phenols, thioureas, tanin, quinoline, morpholine, triethanolamine, tartrates, glycol monoricinoleate, organic nitrites, mercaptans, organic oils, sulfonated hydrocarbons, fatty oils and soaps. Among the inorganic materials which have been employed as inhibitors are sulfates, sulfides, nitrates, fluorides, hydrogen peroxide, alkali metal chromates, nitrites, phosphates, borates, tungstates, molybdates, carbonates, and silicates and alkaline earth metal borates. Some of these corrosion inhibitors can create difficulties in their use. For example, nitrites have the tendency to form toxic nitrosamines in amine-containing compositions.

U.S. Pat. Nos. 3,341,469 and 3,337,496 disclose an aqueous alcohol composition employing organosiloxane-silicate copolymers which have been widely employed in internal combustion and cooling systems. The composition disclosed in these patents comprises:
an alcohol;
an organosiloxane/silicate copolymer present in an amount of from 0.01 percent to 10 percent by weight based upon the weight of said concentrate and consisting essentially of:
(1) from 0.1 to 99.9 parts by weight of at least one member selected from the group consisting of (a) siloxane groups represented by the formula:

RSiO$_{1.5}$ wherein R is a member selected from the group consisting of the methyl, ethyl, phenyl and vinyl groups and (b) siloxane groups represented by the formula:

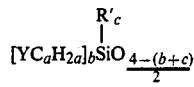

wherein Y is a member selected from the group consisting of the cyano group, CH$_2$(OH)CH(OH)-group, CH$_2$(OH)CH(OH)CH$_2$-group,

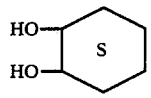

CH$_2$(OH)CH(OH)CH$_2$O-group and R"(OCH$_2$CH$_2$)$_n$(OC$_3$H$_6$)$_m$O-group, wherein R" is a member selected from the group consisting of the monovalent hydrocarbons and the hydrogen atom, n and m are integers and n has a value of at least 1, m has a value from 0 to 20 inclusive, the ratio of n to m is at least 2 to 1, a is an integer and has a value of at least 2, C$_a$H$_{2a}$ is an alkylene group, the group represented by Y is separated from the silicon atom by at least two successive carbon atoms, b is an integer and has a value of from 1 to 3 inclusive, R' is a monovalent hydrocarbon group, c is an integer and has a value from 0 to 2 inclusive, (b+c) has a value from 1 to 3 inclusive; and
(2) from 0.1 to 99.9 parts by weight of at least one silicate group represented by the formula:

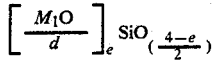

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer.

The above described corrosion-inhibitive heat transfer compositions have enjoyed wide usage. Such composition has superior shelf-life, does not attack rubber parts in cooling systems, is characterized by low levels of foam formation, and is useful over a wide temperature range even after prolonged periods in service.

Despite the foregoing advantages, there exists a continuing need to enhance the corrosion inhibition character of such alcohol and organosiloxane/silicate copolymer composition to minimize corrosion in cooling systems containing aluminum as well as other metals.

Accordingly, it is an object of this invention to provide an improved corrosion-inhibitive heat transfer composition comprising alcohol and organosiloxane/silicate copolymer which is characterized by superior corrosion inhibition with respect to aluminum and other materials structurally employed in aqueous cooling systems, such as those employed for internal combustion engines.

SUMMARY OF THE INVENTION

This invention relates in one aspect to an improved corrosion-inhibitive heat transfer composition concentrate comprising:

(I) an alcohol;

(II) an organosiloxane/silicate copolymer present in an amount of from 0.01 percent to 10 percent by weight based upon the weight of said concentrate and consisting essentially of:

(1) from 0.1 to 99.9 parts by weight of at least one member selected from the group consisting of (a) siloxane groups represented by the formula:

$$RSiO_{1.5}$$

wherein R is a member selected from the group consisting of the methyl, ethyl, propyl, phenyl and vinyl groups and (b) siloxane groups represented by the formula:

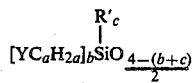

wherein Y is a member selected from the groups consisting of halogen containing groups, cyano containing groups, aryl containing groups, amino containing groups, glycidoxy containing groups, carboxy ester containing groups, glycidoxy containing groups, mercapto containing groups, hydroxy and polyhydroxy containing groups, and mixtures thereof, a is an integer having a value of at least 1, the group represented by Y is separated from the silicon atom by at least two successive carbon atoms, b is an integer having a value of from 1 to 3 inclusive, R' is a monovalent hydrocarbon group, c is an integer having a value from 0 to 2 inclusive, (b+c) has a value from 1 to 3 inclusive; and (2) from 0.1 to 99.9 parts by weight of at least one silicate group represented by the formula:

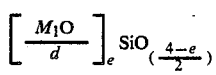

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer, the improvement comprising said composition additionally containing at least one nitrate salt, in the absence of nitrite, in an amount sufficient to provide aluminum corrosion protection.

Typical "Y" substituents would include, for example, $CF_3$, $CN$, $NH_2$, $Cl$, $COOH$, $SH$, $CH_2(O)CHCH_2O$, $NH_2CH_2CH_2NH$, $CH_3OOC$, $CH_3COO$, $(CH_2CH_2O)_n$, $CH_3OOCCH_2CH_2NHCH_2CH_2NH$, carbohydrates, $CH_2(OH)CH(OH)$, $CH_2(OH)CH(OH)CH_2$,

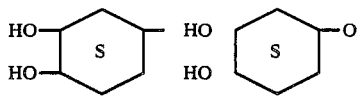

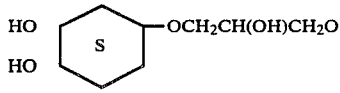

$CH_2(OH)CH(OH)CH_2O$, $CH_2(OH)CH_2OCH_2CH(OH)CH_2O$, $CH_2(OH)CH_2OCH_2CH(OH)CH_2O$, $R''(OCH_2CH_2)_n(OC_3H_6)_mO$ and $R''(OCH_2CH_2)_n(OC_3H_6)_mOCH_2CH(OH)CH_2O$ and the like, wherein R'' is a member selected from the group consisting of the monovalent hydrocarbon and the hydrogen atom, and n and m are integers having a value of from 0 to 20 inclusive.

In another aspect of the invention, the above-described organosiloxane/silicate copolymer composition additionally contains from 0.1 to 99.8 parts by weight of at least one siloxane group selected from the group consisting of the groups represented by the formula:

$$R'''SiO_{1.5}$$

$$R_2'SiO$$

and $$R_3'SiO_{0.5}$$

wherein R''' is a monovalent hydrocarbon group other than the methyl, ethyl, propyl, phenyl and vinyl groups and R' has the above-defined meaning, said parts by weight of said groups in the copolymer being based on 100 parts by weight of the copolymer.

In two other embodiments of the invention, there are encompassed the above compositions additionally containing nitrite in the absence of phosphate, and nitrite in the absence of borate.

DESCRIPTION OF THE PREFERRED EMBODIMENTS

The above-described corrosion-inhibitive heat transfer concentrate may contain about 0.1% to about 10% by weight of water, as based upon the weight of the concentrate. Such aqueous concentrate may thereafter in use be further diluted by addition of from about 25% to about 90% by weight of water based upon the weight of the concentrate, to form a corrosion-inhibitive heat transfer aqueous composition suitable for introduction into automotive internal combustion engine cooling systems. Both the concentrate and the aqueous composition will generally have a pH between about 7 and about 12, preferably between about 8 and about 11.

The alcohol employed in the composition of this invention preferably is at least one alcohol selected from the group consisting of methanol, ethanol, propanol, diethylene glycol, triethylene glycol, propylene glycol, dipropylene glycol, glycerol and ethylene glycol. The preferred alcohol is ethylene glycol.

The nitrate salt employed in the composition of this invention preferably is an alkali metal nitrate, more preferably sodium or potassium nitrate. The nitrate salt is preferably employed in an amount of from about 0.01% to about 1.0% by weight based upon the weight of the (water-free) concentrate, more preferably from about 0.08 to about 0.5 weight percent, most preferably from about 0.1 to about 0.3 weight percent. Below about 0.01 wt.%, the amount of nitrate is expected to be insufficient to be protective to metals, whereas above about 1.0 wt.%, the cost of the nitrate becomes excessive.

The silicone/silicate copolymer useful in the composition of this invention is preferably employed in an amount of from about 0.01% to about 10% by weight, based upon the weight of the concentrate, more preferably from about 0.02 weight percent to about 5 weight percent, most preferably from about 0.02 weight percent to about 2 weight percent, based on the weight of the concentrate. Below about 0.01 wt. %, the amount of siloxane/silicate is expected to be protective to metals, whereas above about 10 wt.%, the cost of the siloxane/silicate becomes excessive without commensurate improvement in metal corrosion.

The silicate useful in the antifreezes of this invention includes inorganic silicates and organic silicates. Useful inorganic silicates are represented by the empirical formula:

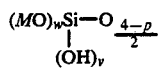

where M is a monovalent cation that forms a glycol soluble silicate selected from the group consisting of sodium, potassium, lithium, rubidium and tetraorganoammonium cations and where w has a value of from 1 to 4 inclusive, v has a value from 0 to 3 inclusive and p has a value from 1 to 4 inclusive which is equal to the sum of w and v; and Useful organic silicates are the esters encompassed by the formula:

wherein R is selected from the group consisting of alkyl, aryl, alkoxyalkyl, alkoxyaryl, hydroxyalkoxy, and mixtures thereof. In use, when diluted with water, it is believed that such esters will form smaller silicate aggregates, which in turn have a greater proficiency in inhibition of metal corrosion as compared to the inorganic silicates.

As illustrative examples of useful inorganic silicates, potassium and sodium silicates are appropriate. Useful organic silicate esters include: alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as hydroxyethyl glycol silicate and hydroxypropyl glycol silicate; and polyhydroxy alcohol silicates such as glycerol silicate and pentaerythritol silicate; oxyalkylene silicates such as methoxy diethylene glycol silicate, i.e. METHYL CARBITOL ® silicate; and mixtures of the above. The preferred organic silicate is tetra-hydroxyethoxy orthosilicate. Also useful within the scope of the present invention is the well-known class of partially condensed orthosilicate esters.

The amount of silicate in the concentrates used to make the antifreezes of this invention can vary over a wide range, as has been discussed, but is preferably present in an amount of between 100 and 700 ppm of equivalent Si, more preferably in an amount between 300 and 500 ppm. Below 100 ppm, insufficient silicate would generally be provided to minimize metal corrosion inhibition in the automobile cooling system, whereas above 700 ppm, silicate gels may be encountered in the antifreeze concentrate. Gelation is undesirable because the silicates in the gel are not available to protect the metal surfaces of the automotive cooling system but rather are aggregated in the gel itself.

The starting silicate used in producing the copolymers useful in this invention can be added to the reaction mixture as such or it can be formed in situ by adding the appropriate hydroxide (e.g. NaOH or KOH) and a silica to the reaction mixture.

The copolymers useful in the present invention can be formed in situ in the antifreeze formulation by mixing organosilanes with silicates in the presence of the alcohol being employed. The process of making copolymers useful in the present invention is well known in the art and is disclosed, for example, in U.S. Pat. No. 3,337,496 incorporated herein by reference. The preferred copolymers comprise 0.1 to 40 parts by weight of siloxane and 60 to 99.9 parts by weight of silicate, said parts by weight being based upon silicon equivalents.

Optional additives may be employed in minor amounts of less than 50 wt. percent based on the weight of the aqueous composition. Typical optional additives would include, for example, known corrosion inhibitors for metals such as, for example, tungstates, selenates, chromates, carbonates and bicarbonates, sebacates and other dicarboxylic acids, molybdates, borates, phosphates and benzoates, hydroxy benzoates or acids thereof, silicones, alkali metal nitrates, alkali metal nitrites, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the aluminum surfaces to be protected. Other typical optional additives would include buffers, such as alkali metal borates, phosphates and carbonates; wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the antifreeze art.

The following example is merely illustrative of, and not intended to limit, the present invention.

EXAMPLE 1

ELECTROCHEMICAL TESTS SHOWING EFFECTIVENESS OF NITRATE WITH SILICONE/SILICATE COPOLYMER

In order to test an automobile coolant composition for effectiveness with and without the use of nitrate, several compositions were formulated, as identified in Table I below. The base fluid consisted of an aqueous borate-phosphate glycol composition.

The composition of each of the fluids, together with the respective pHs and ASTM reserve alkalinities (RA), is given in Table I.

TABLE I

| | Test Fluid Compositions, pHs and Reserve Alkalinity (RA) | | | | | | | |
|---|---|---|---|---|---|---|---|---|
| Fluid # | Borax 5 Mole aq.[d] | NaOH 50% aq. | Potassium Silicate 50%(b) aq. | NaNO$_3$ 40% aq. | Silicone[c] A | H$_3$PO$_4$ 75% aq. | pH 33% aq. | ASTM RA |
| 1 (Base Fluid) | 0.3975 | 0.1858 | — | — | — | 0.6602 | (a) | (a) |
| 2 | 0.3975 | 0.9942 | — | — | 0.0775 | 0.6602 | 10.12 | 11.90 |
| 3 | 0.3975 | 0.1858 | — | 0.50 | — | 0.6602 | (a) | (a) |
| 4 | 0.3975 | 0.1858 | — | 0.50 | 0.0775 | 0.6602 | (a) | (a) |
| 5 | 0.3975 | 0.9942 | 0.3887 | — | — | 0.6602 | 9.85 | 12.65 |
| 6 | 0.3975 | 0.9942 | 0.3887 | — | 0.0775 | 0.6602 | 9.85 | 12.57 |
| 7 | 0.3975 | 0.9942 | 0.3887 | 0.5 | — | 0.6602 | 10.02 | 12.64 |
| 8 (Present Invention) | 0.3975 | 0.9942 | 0.3887 | 0.5 | 0.0775 | 0.6602 | 9.84 | 12.75 |

(a)Nominal pH of 10 and RA of 12
(b)0.3418% Kasil 6 (PQ Corporation) + 0.469% NaOH 50 wt. % aqueous
[c]Silicone A is defined in Table II below.
[d]"aq." denotes aqueous throughout this table.

Each of the compositions given in Table II below was subjected to standard potentiodynamic anodic polarization tests using a Princeton Applied Research Model 350 testing apparatus to give two values on a pure aluminum sample, namely the general surface corrosion value for a given fluid ($I_{Corr}$) and the tendency to pit value ($E_{Br}$). The tests were conducted at room temperature with agitation of each of the compositions.

The results are given in Table II below:

TABLE II

ELECTROCHEMICAL DATA

| pH | Fluid # | Key Components | $I_{Corr}$ (nA/cm2) | $E_{Br}$ |
|---|---|---|---|---|
| 10 | 1 | BASE FLUID | 5,000 | 1.3 |
| 10 | 2 | SILICONE A* | 5,317 | 1.4 |
| 10 | 3 | NITRATE | 5,600 | 1.7 |
| 10 | 4 | SILICONE A*, NITRATE | 8,542 | 1.5 |
| 10 | 5 | SILICATE | 670 | 1.3 |
| 10 | 6 | COPOLYMER A** | 596 | 1.2 |
| 10 | 7 | SILICATE, NITRATE | 1,190 | 1.8 |
| 10 | 8 | COPOLYMER A**, NITRATE | 700 | 1.7 |

*Silicone A is an organosiloxane within the scope of this invention made from a silane having the structural formula: CH$_3$O(CH$_2$CH$_2$O)$_{7.2}$C$_3$H$_6$Si(OCH$_3$)$_3$.
**Copolymer A is a copolymer of the invention consisting of the reaction product of the Silicone A and potassium silicate as detailed in Table I.

The results, as given in Table II above, indicate that, for a given composition, the addition of nitrate provides a reduction in the tendency to pit as measured by an increase in the $E_{Br}$ value (compare the $E_{Br}$ value of fluid #2 with fluid #4; fluid #5 with fluid #7 and fluid #6 with fluid #8). The silicate provides a reduction in the general surface corrosion as measured by a decrease in the $I_{Corr}$ value. The silicone alone, as employed in fluid #2, shows no improvement in either tendency to pit or surface corrosion rate as compared to the base fluid #1. The combination of silicate and nitrate showed a high general surface corrosion rate ($I_{Corr}$) and a low tendency to pit ($E_{Br}$) refer to fluid #7 in Table II.

The testing of fluid #8, in contrast, showed an unexpected improvement. The combination of nitrate with silicone/silicate provides a minimal general surface corrosion rate, as indicated by the very low $I_{Corr}$ shown for fluid #8 of Table I, and a surprisingly effective protection against pit corrosion, as indicated by the high $E_{Br}$ value.

Thus, Fluid #8 gives surprisingly effective performance, especially as compared to the performance of fluid #2 and fluid #7, most notably with regard to $I_{Corr}$. Fluid #2 containing silicone A provided an $I_{Corr}$ of 5,317, and fluid #7 provided an $I_{Corr}$ of 1,190. However, when these three components are combined containing silicate and nitrate in a single fluid (fluid #8) the $I_{Corr}$ dropped down to 700. This decrease was unexpected. This combination of favorable $I_{Corr}$ and $E_{Br}$ values indicates that fluid #8 will provide excellent corrosion resistance in an engine cooling system.

EXAMPLE 2

ELECTROCHEMICAL TESTS ON COMPOSITIONS WITHIN THE SCOPE OF THE PRESENT INVENTION COMPARED TO A PRIOR ART COMPOSITION CONTAINING NITRITE, PHOSPHATE AND BORATE PLUS SILICONE/SILICATE AND NITRITE

Additional formulations were prepared and tested in the apparatus identified in Example 1 above using pure aluminum test specimens.

Formulations A through F were prepared having the ingredients described in Table III. In this regard, it should be noted that formulations B, D and F contain no nitrite, and formulations E and F contain no borate. The formulations were prepared to provide a basis for a side-by-side electrochemical test comparison between several compositions (B through F) within the scope of the present invention and a composition not within the scope of the present invention containing phosphate, borate, nitrate, and nitrite, namely formulation A, a prior art composition.

In addition to measurements of the $I_{Corr}$ and $E_{Br}$ described above, a measurement was made of the "pitting parameter". The pitting parameter is a measure of the total pitting on the surface of an aluminum specimen measured in accordance with the procedure described hereinbelow. Each of the above measures of corrosion is well known to those skilled in the art and in terms of relative importance, $I_{Corr}$ is considered by the art to be more important than the pitting parameter which in turn is considered to be more important than the $E_{Br}$.

TABLE III

| | Electrochemical Test Solution Compositions | | | | | |
|---|---|---|---|---|---|---|
| | Weight-% of Each Component | | | | | |
| Formulation: | A (Comparison) | B | C | D | E | F |
| Base (Ethylene Glycol) | 96.4 | 96.9 | 97.3 | 98.8 | 95.4 | 95.9 |

TABLE III-continued

| | Electrochemical Test Solution Compositions | | | | | |
| | Weight-% of Each Component | | | | | |
| Formulation: | A (Comparison) | B | C | D | E | F |
|---|---|---|---|---|---|---|
| Borate ($Na_2B_4O_7 \cdot 5H_2O$) | 0.4 | 0.4 | 0.8 | 0.8 | — | — |
| NaOH (50%) | 1.0 | 1.0 | 0.4 | 0.4 | 1.7 | 1.7 |
| $H_3PO_4$ (75%) | 0.7 | 0.7 | — | — | 1.4 | 1.4 |
| Polyethylene oxide propyl trimethoxy-silane (having an average of 7 EO groups per molecule) | 0.1 | 0.1 | 0.1 | 0.1 | 0.1 | 0.1 |
| Potassium Silicate | 0.3 | 0.3 | 0.3 | 0.3 | 0.3 | 0.3 |
| NaOH (50 wt. % aqueous) | 0.1 | 0.1 | 0.1 | 0.1 | 0.1 | 0.1 |
| $NaNO_3$ (40 wt. % aqueous) | 0.5 | 0.5 | 0.5 | 0.5 | 0.5 | 0.5 |
| $NaNO_2$ (40 wt. % aqueous) | 0.5 | — | 0.5 | — | 0.5 | — |
| | 100.0 | 100.0 | 100.0 | 100.0 | 100.0 | 100.0 |
| pH (33 wt. % aqueous) | 10.2 | 10.2 | 9.9 | 9.9 | 9.8 | 9.8 |
| RA (ASTM) | 13.0 | 12.6 | 13.6 | 13.0 | 12.4 | 12.1 |

Each of the formulations described in Table III above was tested to determine $I_{Corr}$ and pitting parameters on the Princeton Applied Research Model 350 testing apparatus to determine these corrosion parameters on a pure aluminum test specimen.

As has been noted above, $I_{Corr}$ and the pitting parameters are considered to be more significant than the $E_{Br}$ value. $E_{Br}$ was only measured for formulations A and B, and was found to be comparable for these formulations at 2.1 and 2.2 $E_{Br}$ values, respectively. The results, in terms of $I_{Corr}$ and pitting parameter values, are given in Table II below for each of the formulations.

TABLE IV

| | Electrochemical Test Results on PAR Model 350 Testing Apparatus | |
|---|---|---|
| Formulation | Icorr (nA/cm 2) | Pitting |
| A (Comparison) | 500 | 0.032 |
| B | 500 | 0.005 |
| C | 120 | 0.051 |
| D | 34 | 0.062 |
| E | 25 | 0.018 |
| F | 63 | 0.004 |

The results presented in Table IV show formulations C through F of the present invention to be superior to that of prior art formulation A, on the basis of Icorr alone. Icorr represents the total metal corrosion and this parameter is of paramount importance in the assessment of corrosion, as for example discussed in the publication *Corrosion and Corrosion Control* by Herbert H. Uhlig (Second Edition, 1971), pps. 14 and 39. Uhlig describes pitting as an attack on an area of metal acting as an anode, whereas $I_{Corros}$ is described as the corrosion rate of anodic areas of a metal surface (see pages 14 and 39, respectively of Uhlig). Hence, as explained by the Uhlig $I_{Corr}$ is a total metal corrosion parameter, of which pitting is only one part. The pitting parameter (total pitting measurement) shows formulation B to be superior to that of formulation A.

EXAMPLE 3

ELECTROCHEMICAL TESTS ON COMPOSITIONS WITHIN THE SCOPE OF THE PRESENT INVENTION SHOWING THE CORROSION-INHIBITIVE PERFORMANCE ON ALUMINUM OF VARIOUS SILICONES, AND SILICONE TO SILICATE RATIOS, AS WELL AS VARIOUS NITRATE LEVELS

Still further formulations were prepared and tested on the testing apparatus described in Example 1 above. In the present example, several different silicones within the scope of the present invention as described in Table V were tested to determine the $I_{corr}$ and pitting parameter values for each formulation on the Princeton Applied Research Model 350 testing apparatus using a pure aluminum test specimen. It is noted that formulation H was diluted to 33 wt.% aqueous and heated to 100° C. and maintained at that temperature overnight before testing. The other formulations were prepared and tested immediately thereafter.

TABLE V

| | Electrochemical Test Solution Compositions | | | | |
| | Weight-% Of Each Component | | | | |
| Formulation: | G | H | I | J | K |
|---|---|---|---|---|---|
| Base (Ethylene Glycol) | 97.2632 | 96.4427 | 92.0447 | 96.2632 | 93.7632 |
| Borate | 0.3975 | 0.3975 | 0.3975 | 0.3975 | 0.3975 |
| ($Na_2B_4O_7 5H_2O$) | 0.3975 | 0.3975 | 0.3975 | 0.3975 | 0.3975 |
| NaOH (50%) | 0.9936 | 0.9936 | 1.1370 | 0.9936 | 0.9936 |
| $H_3PO_4$ (75%) | 0.6602 | 0.6602 | 0.6602 | 0.6602 | 0.6602 |
| Silicone: | | | | | |
| NC $C_2H_4Si(OEt)_3$ | 0.0006 | — | — | 0.0006 | 0.0006 |
| $CH_3COOC_2H_4Si(OEt)_3$ | — | 0.5560 | 0 | — | — |
| $HCOC_2H_4Si(OEt)_3$ | — | — | 0.9990 | — | — |
| $MeO(EO)_{20}(CH_2)_3Si(OMe)_3$ | — | — | 3.9960 | — | — |
| Sodium Silicate* | 0.3727 | 0.0015 | 0.0133 | 0.3727 | 0.3727 |
| NaOH (50 wt. % aqueous) | 0.0622 | 0.0002 | 0.0023 | 0.0622 | 0.0622 |
| $H_2O$ | — | 0.1983 | — | — | — |
| $NaNO_3$ (40 wt. % aqueous) | 0.2500 | 0.7500 | 0.7500 | 1.2500 | 3.7500 |
| Total | 100.0000 | 100.0000 | 100.0000 | 100.000 | 100.000 |
| pH (33 wt. % aqueous) | 9.9 | 9.9 | 10.2 | 9.9 | 9.9 |

TABLE V-continued

| | Electrochemical Test Solution Compositions | | | | |
| --- | --- | --- | --- | --- | --- |
| | Weight-% Of Each Component | | | | |
| Formulation: | G | H | I | J | K |
| RA (ASTM) | 13.2 | 12.4 | 13.0 | 13.2 | 13.2 |

*PQ "N", a product of PQ Corporation.

TABLE VI

Electrochemical Test Results on
PAR Model 350 Testing Apparatus

| Formulation | wt % $NaNO_3$ | $I_{Corr}$ (nA/cm 2) | Pitting Parameter |
| --- | --- | --- | --- |
| G | 0.1 | 190 | 0.002 |
| H | 0.3 | 30 | 0.025 |
| I | 0.3 | 90 | 0.003 |
| J | 0.5 | 90 | −0.00075 |
| K | 1.0 | 260 | −0.0024 |

As can be readily seen from the data in Table VI, the $I_{Corr}$ and pitting parameter values fall within the ranges obtained for formulations C through F as given in Table V. The values of $I_{Corr}$ and pitting parameter represent reduced corrosion as compared to the corresponding results for formulation A given in Table IV. It is particularly noteworthy that these excellent results are achieved using a formulation having very low silicone to silicate ratio of about 1 to 999 (formulation G) and also very high silicone to silicate ratio of 999 to 1 (formulation H). In addition to testing this range of silicone to silicate ratios, various silicones were utilized as identified in Table V.

Also tested were several nitrate amounts that calculate to be 0.1 wt.% (formulation G); 0.3 wt.% (formulations H and I); 0.5 wt.% (formulation J); and 1.0 wt.% (formulation K) of nitrate based on the total weight of the composition. Effective total metal corrosion inhibition was provided over this range of nitrate amounts as is demonstrated by the low $I_{Corr}$ values provided by formulations G through K.

We claim:

1. An improved method for protecting from corrosion an automobile internal combustion engine cooling system with a corrosion-inhibitive heat transfer composition concentrate wherein said method comprises diluting said concentrate with from about 15 to about 90 percent by weight of water, based on the weight of the concentrate and introducing such to an automobile internal combustion engine cooling system, said concentrate comprising:
   (I) an alcohol;
   (II) an organosiloxane/silicate copolymer present in an amount from 0.01 percent to 10 percent by weight based upon the weight of said concentrate and consisting essentially of:
     (1) from 0.1 to 99.9 parts by weight of at least one member selected from the group consisting of (a) siloxane groups represented by the formula:

$$RSiO_{1.5}$$

wherein R is a member selected from the group consisting of the methyl, ethyl, propyl, phenyl and vinyl groups and (b) siloxane groups represented by the formula:

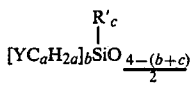

wherein Y is a member selected from the groups consisting of halogen containing groups, cyano containing groups, aryl containing groups, amino containing groups, carboxy containing groups, carboxy ester containing groups, glycidoxy containing groups, mercapto containing groups, hydroxy and polyhydroxy containing groups, and mixtures thereof, a is an integer having a value of at least 2, the group represented by Y is separated from the silicon atom by at least two successive carbon atoms, b is an integer having a value from 1 to 3 inclusive, R' is a monovalent hydrocarbon group, c is an integer having a value from 0 to 2 inclusive, (b+c) has a value from 1 to 3 inclusive; and
   (2) from 0.1 to 99.9 parts by weight of at least one silicate group represented by the formulae and mixtures thereof:

(A)

wherein M is a cation that forms a water soluble silicate, d is the valence of the cation represented by M and has a value of at least 1 and e has a value from 1 to 3 inclusive,

(B)

wherein R is selected from the group consisting of alkyl, aryl, alkoxyalkyl, alkoxyaryl, hydroxyalkoxy, and mixtures thereof, said parts by weight of said groups in the copolymer being based on 100 parts by weight of the copolymer, and
   (III) at least one nitrate salt, in the absence of nitrite, present in an amount of from about 0.08 to about 0.5 weight percent based on the total weight of the composition.

2. The improved method of claim 1 wherein the nitrate in the concentrate is present on an amount of from about 0.1 to about 0.3 weight percent based on the total weight of the composition.

3. An improved method for protecting from corrosion an automobile internal combustion engine cooling system with a corrosion-inhibitive heat transfer composition concentrate wherein said method comprises diluting said concentrate from about 25 to about 90 percent by weight of water, based on the weight of the concentrate, and introducing the diluted concentrate to an automobile internal combustion engine cooling system wherein said concentrate comprising:
   (I) an alcohol;

(II) an organosiloxane/silicate copolymer present in an amount of from 0.01 percent to 10 percent by weight based upon weight of said concentrate and consisting essentially of:
(1) from 0.1 to 99.9 parts by weight of at least one member selected from the group consisting of (a) siloxane groups represented by the formula:

$RSiO_{1.5}$ wherein R is a member selected from the group consisting of the methyl, ethyl, propyl, phenyl and vinyl groups and (b) siloxane groups represented by the formula:

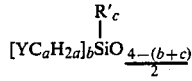

wherein Y is a member selected from the group consisting of halogen containing groups, cyano containing groups, aryl containing groups, amino containing groups, carboxy containing groups, glycidoxy containing groups, mercapto containing groups, hydroxy and polyhydroxy containing groups, and mixtures thereof, a is an integer having a value of at least 2, the group represented by Y is separated from the silicon atom by at least two successive carbon atoms, b is an integer having a value from 1 to 3 inclusive, R' is a monovalent hydrocarbon group, c is an integer having a value from 0 to 2 inclusive, (b+c) has a value from 1 to 3 inclusive; and
(2) from 0.1 to 99.9 parts by weight of at least one silicate group represented by the formulae and mixtures thereof:

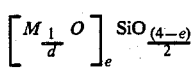 (A)

wherein M is a cation that forms a water soluble silicate, d is the valence of the cation represented by M and has a value of at least 1 and e has a value from 1 to 3 inclusive, $Si(OR)_4$ (B)

wherein R is selected from the group consisting of alkyl, aryl, alkoxyalkyl, alkoxyaryl, hydroxyalkoxy, and mixtures thereof, said parts by weight of said groups in the copolymer being based on 100 parts by weight of the copolymer,
(III) a borate in the absence of phosphate, and
(IV) a nitrate present in an amount of from about 0.08 to about 0.5 weight percent based on the total weight of the composition.

4. An improved method for protecting from corrosion an automobile internal combustion engine cooling system with a corrosion-inhibitive heat transfer composition concentrate wherein said method comprises diluting said concentrate with from 25 percent to about 90 percent by weight of water based on the weight of the concentrate, an introducing the diluted concentrate to an automobile internal combustion engine cooling system wherein said concentrate comprising:
(I) an alcohol;

(II) an organosiloxane/silicate copolymer present in an amount of from 0.01 percent to 10 percent by weight based upon the weight of said concentrate and consisting essentially of:
(1) from 0.1 to 99.9 parts by weight of at least one member selected from the group consisting of (a) siloxane groups represented by the formula:

$RSiO_{1.5}$ wherein R is a member selected from the group consisting of the methyl, ethyl, propyl, phenyl and vinyl groups and (b) siloxane groups represented by the formula:

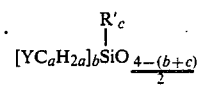

wherein Y is a member selected from the groups consisting of halogen containing groups, cyano containing groups, aryl containing groups, amino containing groups, carboxy containing groups, carboxy ester containing groups, glycidoxy containing groups, mercapto containing groups, polyhydroxy containing groups, and mixtures thereof, a is an integer having a value of at least 2, the group represented by Y is separated from the silicon atom by at least two successive carbon atoms, b is an integer having a value of from 1 to 3 inclusive, R' is a monovalent hydrocarbon group, c is an integer having a value from 0 to 2 inclusive, (b+c) has a value from 1 to 3 inclusive; and
(2) from 0.1 to 99.9 parts by weight of at least one silicate group represented by the formulae and mixtures thereof:

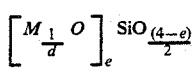 (A)

wherein M is a cation that forms a water soluble silicate, d is the valence of the cation represented by M and has a value of at least 1 and e has a value from 1 to 3 inclusive, $Si(OR)_4$ (B)

wherein R is selected from the group consisting of alkyl, aryl, alkoxyalkyl, alkoxyaryl, hydroxyalkoxy, and mixtures thereof, said parts by weight of said groups in the copolymer being based on 100 parts by weight of the copolymer,
(III) a phosphate in the absence of borate,
(IV) a nitrate present in an amount of from about 0.08 to about 0.05 weight percent based on the total weight of the composition.

5. The method of any of claims 1 through 4 wherein said Y in said composition concentrate is selected from the group consisting of carbohydrates, $CF_3$, $CN$, $NH_2$, $Cl$, $COOH$, $SH$, $CH_2(O)CHCH_2O$, $NH_2CH_2CH_2NH$, $CH_3OOC$, $CH_3COO(CH_2CH_2O)_n$, $CH_3OOCCH_2CH_2NHCH_2CH_2NH$ $CH_2(OH)CH(OH)$, $CH_2(OH)CH(OH)CH_2$,

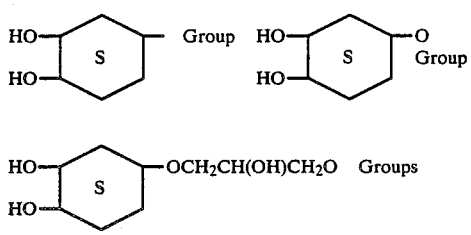

CH$_2$(OH)CH(OH)CH$_2$O, CH$_2$(OH)CH(OH)CH$_2$OCH$_2$CH(OH)CH$_2$O, CH$_2$(OH)CH$_2$OCH$_2$CH(OH)CH$_2$O, R"(OCH$_2$CH$_2$)$_n$(OC$_3$H$_6$)$_m$O, and R"(OCH$_2$CH$_2$)$_n$(OC$_3$H$_6$)$_m$OCH$_2$CH(OH)CH$_2$O group, and the like, wherein R" is a member selected from the group consisting of the monovalent hydrocarbon and the hydrogen atom, and n and m are integers having a value of from 0 to 20 inclusive.

6. The method of any of claims 1 through 4 wherein said organosiloxane/silicate copolymer additionally contains from 0.1 to 99.8 parts by weight of a siloxane group selected from the group consisting of the groups represented by the formulae:

$$R'''SiO_{1.5}$$

$$R_2'SiO$$

and $$R_3'SiO_{0.5}$$

wherein R''' is a monovalent hydrocarbon group other than the methyl, ethyl, phenyl and vinyl groups and R' has the above-defined meaning, said parts by weight of said groups in the copolymer being based on 100 parts by weight of the copolymer.

7. The method of any of claims 1 through 4 wherein said composition concentrate additionally contains water in an amount sufficient to form a corrosion-inhibitive heat transfer composition.

8. The method of any of claims 1 through 4 wherein said composition concentrate additionally contains carbonate or sebacate or a mixture thereof.

9. The method of any of claims 1 through 4 wherein said organosiloxane/silicate copolymer comprises 0.1 to 40 parts by weight of siloxane and 60 to 99.9 parts by weight of silicate, said parts by weight being based upon silicone equivalents.

* * * * *